United States Patent [19]
Yoshino

[11] Patent Number: 5,850,129
[45] Date of Patent: Dec. 15, 1998

[54] DRIVE CIRCUIT FOR A THREE-PHASE BRUSHLESS MOTOR

[75] Inventor: Motoyasu Yoshino, Kyoto, Japan

[73] Assignee: Rohm Co., Ltd., Kyoto, Japan

[21] Appl. No.: 911,189

[22] Filed: Aug. 14, 1997

[30]  Foreign Application Priority Data

Aug. 20, 1996   [JP]   Japan .................................... 8-218183

[51] Int. Cl.$^6$ .................................................. H02K 23/00
[52] U.S. Cl. ............................................ 318/254; 318/439
[58] Field of Search .................................... 318/254, 439, 318/138

[56]  References Cited

U.S. PATENT DOCUMENTS

| | | | |
|---|---|---|---|
| 4,743,815 | 5/1988 | Gee et al. | 318/254 |
| 4,763,347 | 8/1988 | Erdman | 318/254 |
| 4,912,378 | 3/1990 | Vukosavic | 318/254 |
| 5,075,608 | 12/1991 | Erdman et al. | 318/599 |
| 5,182,499 | 1/1993 | Inaji et al. | 318/254 |
| 5,319,289 | 6/1994 | Austin et al. | 318/254 |

*Primary Examiner*—Brian Sircus
*Attorney, Agent, or Firm*—Nikaido, Marmelstein, Murray & Oram LLP

[57] ABSTRACT

A three-phase brushless motor drive circuit switches its three-phase outputs by producing drive signals displaced in phase relative to one another. In this drive circuit, a reference clock is formed from the signals obtained by comparing the output voltages appearing across the coils of a three-phase motor individually with a voltage at a terminal common to the three phases. This reference clock is subjected to edge detection by an edge detection circuit. The output voltages include noises generated when the outputs are switched. The noise components produced when the reference clock is subjected to edge detection are reduced by a noise reduction circuit. A resulting edge detection output, which no longer includes noise components, is used to trigger an RS flip-flop to form a pulse-train signal. This pulse-train signal is used to control the charging and discharging of a capacitor. A sawtooth voltage appearing across this capacitor is compared with a predetermined reference voltage by a voltage comparator, and, in accordance with a comparison output, the displacement in phase of the pulse-train signal is determined and the pulse-train signal is distributed to produce separate signals for the three phases.

5 Claims, 4 Drawing Sheets

DRIVE CIRCUIT FOR A THREE-PHASE BRUSHLESS MOTOR

BACKGROUND OF THE INVENTION

1. Field of the Invention

The present invention relates to a drive circuit for a three-phase brushless motor used in hard disk drives, floppy disk drives, videocassette recorders, and the like.

2. Description of the Prior Art

In a drive circuit for a three-phase brushless motor, to achieve proper switching between three-phase outputs, it is necessary to generate drive signals displaced in phase by 30° relative to one another. For this purpose, conventional drive circuits are provided with circuits for generating trapezoid-wave signals, one for each phase, and these circuits are each provided with a capacitor. In generating the drive signals, the output voltages appearing across the coils that are provided one for each phase are fed back to the drive circuit. These output voltages include pulse-like noises that result from the back electromotive forces induced when currents are switched, and therefore conventional drive circuits are provided also with a noise reduction circuit for reducing such noises.

A disadvantage of conventional drive circuits is that they require three capacitors. This necessitates separate mounting of those capacitors when the drive circuit is formed as an IC (integrated circuit), and thus leads to an increased number of the terminal pins of the IC as well as to extra time and work needed to mount such separate components. Moreover, as long as the drive circuit includes so many capacitors, it is impossible to make the circuit board for accommodating it compact enough.

SUMMARY OF THE INVENTION

An object of the present invention is to provide a three-phase brushless motor drive circuit that includes as few capacitors as possible.

Another object of the present invention is to provide a three-phase brushless motor drive circuit in which capacitors for displacing the phases of the drive signals are used also to form noise reduction signals.

To achieve the above objects, according to the present invention, a drive circuit for a three-phase brushless motor is provided with comparing means for comparing output voltages appearing across coils of a three-phase motor individually with a voltage at a terminal common to three phases; means for forming a reference clock from signals outputted from the comparing means; detecting means for detecting edges of the reference clock; a noise reduction circuit for reducing noise components that are generated by noises included in the output voltages when the reference clock is subjected to edge detection; means for forming a pulse-train signal by being triggered by an edge detection output obtained through the noise reduction circuit; means for controlling charging and discharging of one capacitor in synchronism with the pulse-train signal; means for making a voltage comparator perform voltage comparison between a sawtooth voltage appearing across the capacitor and a predetermined reference voltage in order to determine displacement of the pulse-train signal in accordance with a result of the voltage comparison; and means for distributing the pulse-train signal outputted from the pulse-train signal forming means to produce three-phase drive signals.

According to another aspect of the present invention, a drive circuit is provided with voltage comparators, provided one for each phase, for comparing output voltages appearing across coils of a three-phase motor individually with a voltage at a terminal common to three phases; a reference clock generating circuit for generating a reference clock based on voltages outputted from the voltage comparators, said reference clock being displaced in phase by 60° relative to switching timing of the output voltages and having one third of a period of the output voltages; a detecting circuit for detecting edges of the reference clock; a noise reduction circuit for reducing noise components that are generated by noises included in the output voltages when the reference clock is subjected to edge detection; an RS flip-flop for forming a pulse-train signal by using as a set signal an edge detection output obtained through the noise reduction circuit; a circuit for controlling charging and discharging of one capacitor in synchronism with the pulse-train signal; a first voltage comparator for performing voltage comparison between a sawtooth voltage appearing across the capacitor and a first reference voltage to reset the RS flip-flop in accordance with a result of the voltage comparison; means for forming three-phase drive signals in synchronism with the pulse-train signal outputted from the RS flip-flop; a second voltage comparator for comparing the sawtooth voltage with a second reference voltage; and means for feeding pulses outputted from the second voltage comparator to the noise reduction circuit to achieve noise reduction. In this case, the noise reduction circuit reduces noises present during periods of the pulses fed from the second voltage comparator.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
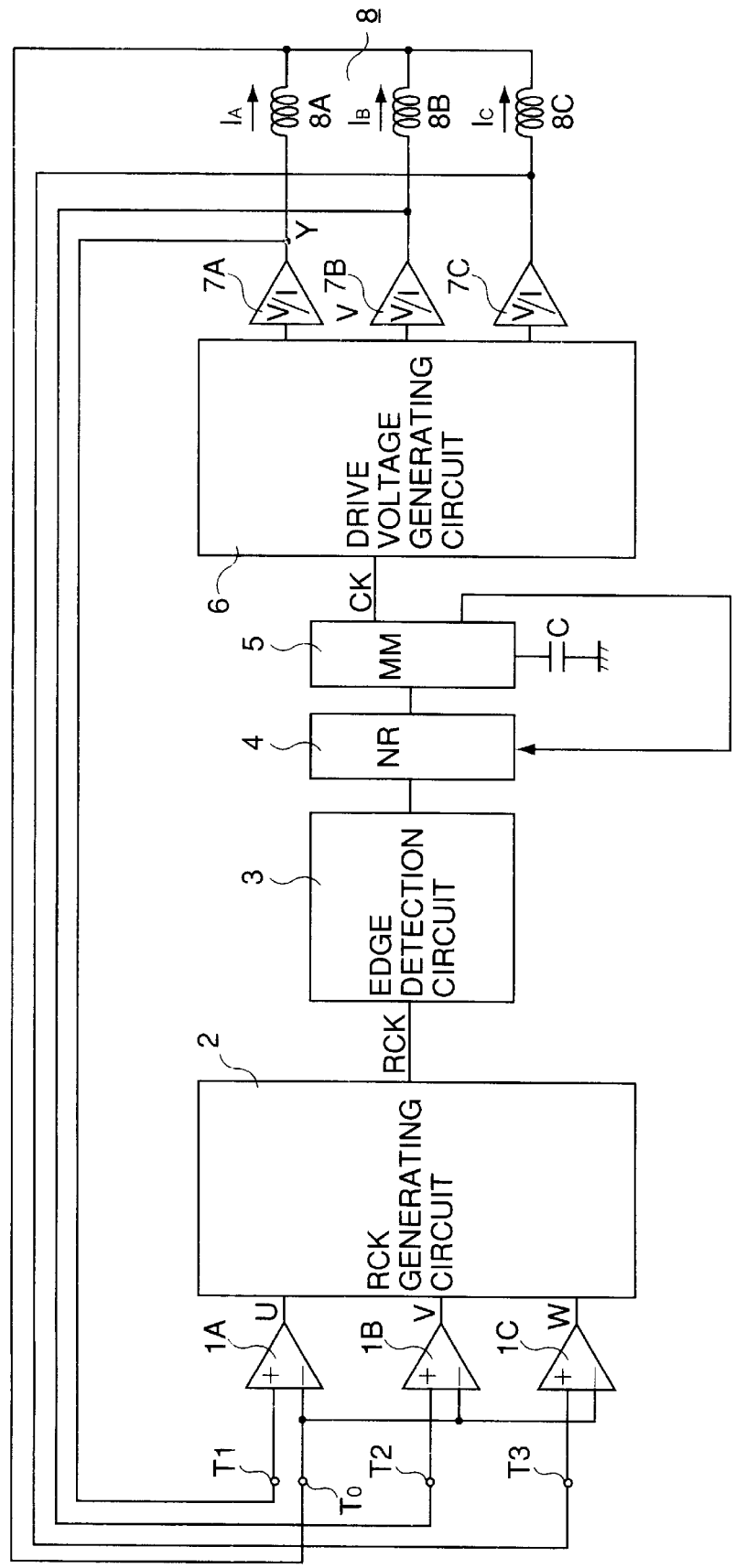
FIG. 1 is a block diagram of an example of a three-phase brushless motor drive circuit embodying the present invention.

FIG. 1 shows an example of a three-phase brushless motor drive circuit embodying the present invention. First, an outline of the operation of this motor drive circuit will be described. When currents $I_A$, $I_B$, and $I_C$ flow through the coils 8A, 8B, and 8C, respectively, of a three-phase motor 8, voltages are induced in those coils 8A, 8B, and 8C. These voltages are fed to comparators 1A, 1B, and 1C via input terminals T1, T2, and T3. The comparators 1A, 1B, and 1C each receive also the voltage at the common terminal of the motor 8 (i.e. the terminal common to the coils 8A, 8B, and 8C) as a reference voltage via another input terminal $T_0$.

The comparators 1A, 1B, and 1C output voltages U, V, and W to a reference clock generating circuit 2. In response, the reference clock generating circuit 2 outputs a pulse signal (reference clock RCK) whose polarity is reversed every 60° relative to the output voltages U, V, and W. This reference clock RCK is subjected to edge detection by an edge detection circuit 3 and then to noise reduction by a noise reduction circuit 4.

A monostable multivibrator 5 forms negative pulses for noise reduction and feeds them to the noise reduction circuit 4. In addition, the monostable multivibrator 5 outputs another clock CK that is delayed in phase by 30° relative to the reference clock RCK. In synchronism with this clock CK, a drive voltage generating circuit 6 outputs three-phase drive voltages that are displaced in phase by 120° relative to one another. These drive voltages are then converted by voltage-to-current conversion (V/I conversion) circuits 7A, 7B, and 7C into currents $I_A$, $I_B$, and $I_C$, which are supplied to the coils 8A, 8B, and 8C.

Next, the operation of this motor drive circuit will be described in more detail. As shown at (k), (l), and (m) in FIG. 3, each of the output currents $I_A$, $I_B$, and $I_C$ has one of three levels (L-, M-, and H-level) at a time, and therefore has a staircase-shaped waveform as a whole. Specifically, an L-level current is a current that flows into a V/I conversion circuit, an M-level current is a zero current, and an H-level current is a current that flows out of a V/I conversion circuit.

Figure 3:
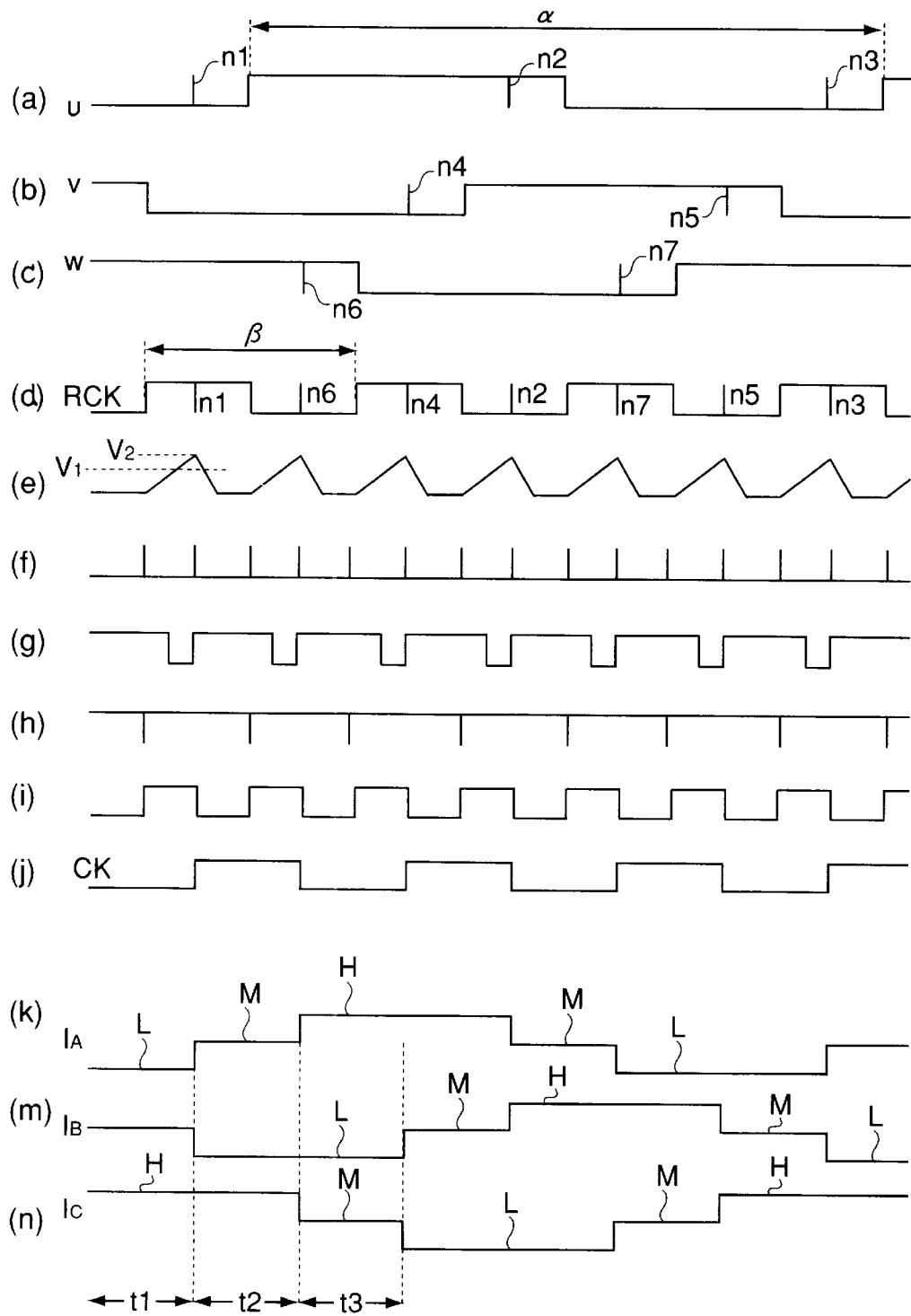
FIG. 3 is a waveform diagram of some signals present at various points in the motor drive circuit of the present invention.

Accordingly, during the period t1 in FIG. 3, the current $I_C$ from the V/I conversion circuit 7C flows through the coil 8C, and then, via the common terminal, flows through the coil 8A, and then, as the current $I_A$, flows into the V/I circuit 7A. Meanwhile, the current $I_B$ remains zero, and thus no current flows through the coil 8B.

Likewise, during the period t2, the current from the V/I conversion circuit 7C flows through the coil 8C and the coil 8B into the V/I circuit 7B. Meanwhile, no current flows through the coil 8A. During the period t3, the current from the V/I conversion circuit 7A flows through the coil 8A and the coil 8B into the V/I circuit 7B. Meanwhile, no current flows through the coil 8C.

Figure 4:
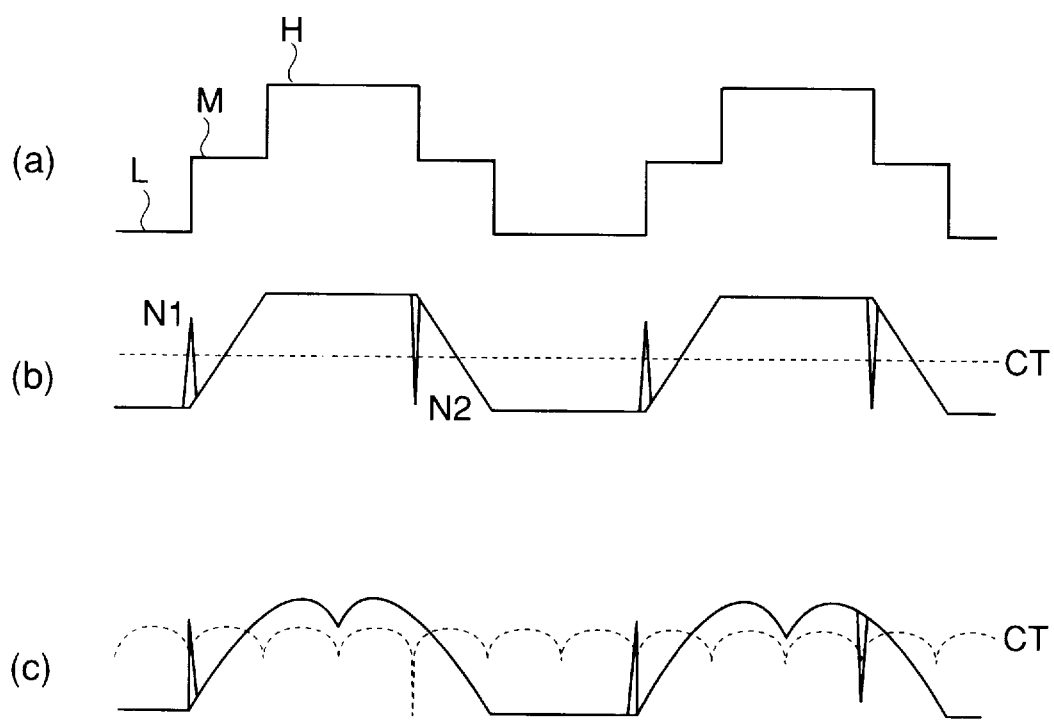
FIG. 4 is a waveform diagram of other signals present in the motor drive circuit of the present invention.

Next, with reference to FIG. 4, the voltages U, V, and W induced by the currents flowing through the coils 8A, 8B, and 8C will be described. Now, suppose that a current as shown at (a) in FIG. 4 flows through the coil 8A. Then, the voltage at the node Y in FIG. 1 varies as shown at (b) in FIG. 4, provided that the torque is kept at its maximum.

Meanwhile, every time the current flowing through the coil 8A drops to zero, a pulse-like noise, such as $N_1$ and $N_2$, is produced. Notice that two successive noises, like $N_1$ and $N_2$, have the opposite polarities. This is because the directions of the current immediately before the generation of those noises are opposite. In FIG. 4, whereas the waveform observed when the torque is kept at its maximum is shown at (b), the waveform observed under more ordinary operating conditions is shown at (c). However, to take advantage of the simpler waveform, the following descriptions assume that the torque is kept at its maximum.

As described previously, the voltage induced at the node Y by the coil 8A is fed via the input terminal T1 to the non-inverting terminal (+) of the comparator 1A. The comparator 1A then compares that voltage with the voltage CT (indicated by the broken line in FIG. 4) at the common terminal. The voltage CT is fed to the inverting terminal (−) of the comparator 1A. As a result, the comparator 1A outputs the voltage U, which has a waveform as shown at (a) in FIG. 3. Here, n1, n2, and n3 represent noises that are produced in response to the noises $N_1$, $N_2$, and so forth. Likewise, the comparator 1B outputs the voltage V, which has a waveform as shown at (b) in FIG. 3 and includes noises n4 and n5, and the comparators 1C outputs the voltage W, which has a waveform as shown at (c) in FIG. 3 and includes noises n6 and n7.

These noises n1 to n7 appear intact in the reference clock RCK, as shown at (d) in FIG. 3. The period β of the reference clock RCK is one third of the period a of the voltages U, V, and W. In other words, the reference clock RCK is a pulse signal whose polarity is reversed every 60°. However, the noises n1 to n7 included in the reference clock RCK cause malfunction of the circuits succeeding the reference clock generating circuit 2 (for example, the monostable multivibrator 5). To avoid this, the reference clock RCK is then subjected to noise reduction by the noise reduction circuit 4.

Figure 2:
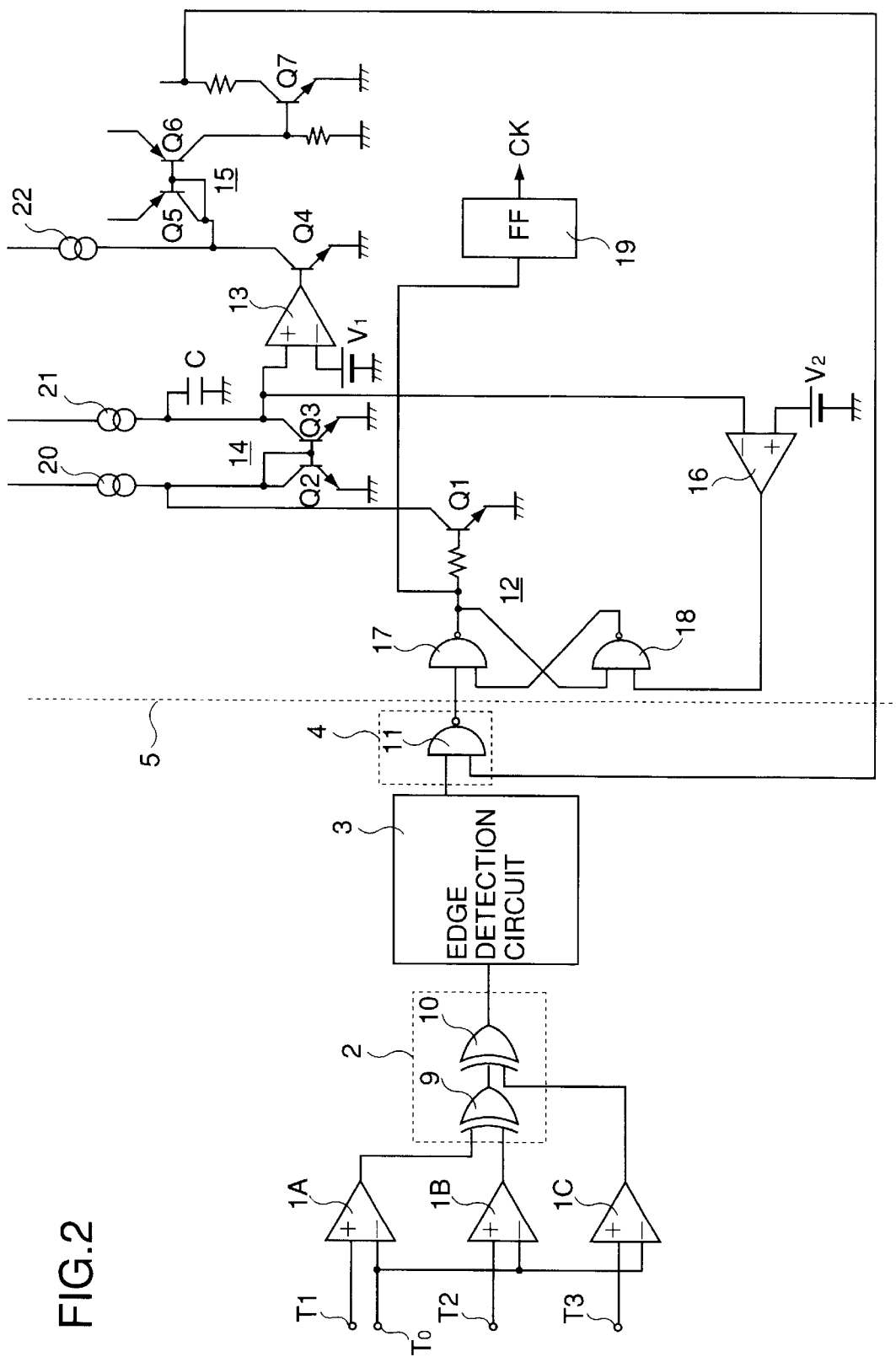
FIG. 2 is a circuit diagram showing an exemplary construction of the principal portions of the motor drive circuit of the present invention.

With reference to FIG. 2, the noise reduction circuit 4 and the monostable multivibrator 5 will be described in more detail. The output voltages U, V, and W, which are produced one for each phase, are respectively fed via the input terminals T1, T2, and T3 to the non-inverting terminals (+) of the comparators 1A, 1B, and 1C. On the other hand, the voltage at the common terminal is fed via the terminal $T_0$ to the inverting terminals (−) of the comparators 1A, 1B, and 1C. The reference clock generating circuit 2 is composed of two exclusive-OR gates 9 and 10 connected as shown in the figure. The exclusive-OR gate 9 receives the outputs of the comparators 1A and 1B, and the exclusive-OR gate 10 receives the output of the exclusive-OR gate 9 and the output of the comparator 1C. The output of the reference clock generating circuit 2 has a waveform as shown at (d) in FIG. 3.

The noise reduction circuit 4 is composed of a NAND gate 11, which reduces the noises n1 to n7 by performing logical multiplication between the edge detection output ((f) in FIG. 3) fed from the edge detection circuit 3 and the negative pulses for noise reduction ((g) in FIG. 3) fed from the monostable multivibrator 5.

The monostable multivibrator 5 is composed of an RS flip-flop 12, npn-type transistors Q1 to Q4 and Q7, pnp-type transistors Q5 and Q6, voltage comparators 13 and 16, a capacitor C, current mirror circuits 14 and 15, a flip-flop 19, and other components. As described previously, the monostable multivibrator 5 serves to form negative pulses for noise reduction as well as to displace the phase of the clock CK by 30°. The transistor Q1 has its base connected to the output of the RS flip-flop 12, has its emitter connected to ground, and has its collector connected to the current mirror circuit 14 and to a constant current source 20. The current mirror circuit 14 is composed of the transistors Q2 and Q3. The emitters of these transistors Q2 and Q3 are connected to ground. The collector of the transistor Q3 is connected to a current source 21 and to the capacitor C. The capacitor C is, at its other end, connected to ground. The voltage comparator 16 is, at its inverting terminal (−), connected to the capacitor C, and is, at its non-inverting terminal (+), supplied with a direct-current voltage $V_2$. The output terminal of the voltage comparator 16 is connected to one input terminal of the NAND gate 18 of the RS flip-flop 12. The voltage comparator 13 is, at its non-inverting terminal (+), connected to the capacitor C, and is, at its inverting terminal (−), supplied with a reference voltage $V_1$. The output of the voltage comparator 13 is connected to the base of the transistor Q4. The transistor Q4 has its emitter connected to ground, and has its collector connected to a constant current source 22 and to the current mirror circuit 15. The current mirror circuit 15 is composed of the transistors Q5 and Q6, and its output is fed to the base of the transistor Q7. The transistor Q7 has its emitter connected to ground, and has its collector connected to the noise reduction circuit 4.

The RS flip-flop 12 is composed of two NAND gates 17 and 18, of which one 17 receives as a set signal the output of the noise reduction circuit 4, and the other 18 receives as a reset signal the output of the voltage comparator 16. The output of the RS flip-flop 12 ((i) in FIG. 3) is formed into the clock CL by the flip-flop 19.

The output of the RS flip-flop 12 is also fed through the transistor Q1 to a noise reduction pulse generator. Specifically, first, after the reduction of noises, the edge detection output (h) sets the RS flip-flop 12, turning its output (i) high. While the output of the RS flip-flop 12 is held high, the transistor Q1 remains in the ON state, and the current mirror circuit 14 remains in the OFF state, so that the capacitor C is charged by the current from the constant current source 20. As a result, across the capacitor C appears a voltage having a sawtooth waveform as shown at (e) in FIG. 3.

When this sawtooth voltage reaches the reference voltage $V_2$, the voltage comparator 16 turns its output low, and thereby resets the RS flip-flop 12, turning its output low. As a result, the transistor Q1 is turned off, and the transistors Q2 and Q3 are turned on, so that the capacitor C discharges through the transistor Q3. The RS flip-flop 12 turns its output high again when it receives the next edge detection output.

Thereafter, the above operation sequence is repeated, so that the RS flip-flop 12 outputs a sequence of pulses as shown at (i) in FIG. 3. These pulses, having half the period β of the pulse signal shown at (d) of FIG. 3 (the reference clock), constitute a pulse signal whose polarity is reversed every 30° with respect to the voltages U, V, and W. The flip-flop 19 is triggered at every trailing edge of this pulse signal (i), and thus outputs a pulse signal ((j) in FIG. 3) whose polarity is reversed at every trailing edge of the pulse signal (i). The thus obtained pulse signal (j) is used as the clock CK.

This clock CK is delayed in phase by 30° relative to the reference clock RCK shown at (d) in FIG. 3. This delay of 30° is introduced by the voltage comparator 16 that defines the trailing edges of the pulse signal (i).

On the other hand, when the above-mentioned sawtooth voltage exceeds the reference voltage $V_1$ that is lower than the reference voltage $V_2$, the voltage comparator 13 turns its output high. This output appears, through the transistor Q4 and the current mirror circuit 15, at the collector of the transistor Q7, and is then supplied, as negative pulses (g) for noise reduction, to the noise reduction circuit 4.

As described above, in the motor drive circuit embodying the present invention, only one capacitor C is used to produce noise reduction pulses as well as to form a clock that is displaced by a predetermined phase angle (specifically, advanced by 30°) relative to the output voltages U, V, and W. Although the above descriptions assume that the phase displacement is 30°, the phase displacement may in reality be set at any value appropriate for practical applications.

As described above, according to the present invention, in a three-phase brushless motor drive circuit, it is possible to satisfactorily reduce noises due to back electromotive force with a minimal number of capacitors. As a result, especially when the motor drive circuit is formed as an IC, it is easy to mount a capacitor that needs to be mounted separately from the IC and to adjust the circuit characteristics by the use of such a separately mounted component.

What is claimed is:

1. A three-phase brushless motor drive circuit that switches its outputs by producing drive signals displaced in phase relative to one another, comprising:

comparing means for comparing output voltages appearing across coils of a three-phase motor individually with a voltage at a terminal common to three phases;

means for forming a reference clock from signals outputted from the comparing means;

detecting means for detecting edges of the reference clock;

a noise reduction circuit for reducing noise components that are generated by noises included in the output voltages when the reference clock is subjected to edge detection;

means for forming a pulse-train signal by being triggered by an edge detection output obtained through the noise reduction circuit;

means for controlling charging and discharging of one capacitor in synchronism with the pulse-train signal;

means for making a voltage comparator perform voltage comparison between a sawtooth voltage appearing across the capacitor and a predetermined reference voltage in order to determine displacement of the pulse-train signal in accordance with a result of the voltage comparison; and means for distributing the pulse-train signal outputted from the pulse-train signal forming means to produce three-phase drive signals.

2. A three-phase brushless motor drive circuit as claimed in claim 1, further comprising:

means for forming from the sawtooth voltage a signal for reducing the noise components.

3. A three-phase brushless motor drive circuit as claimed in claim 1, wherein the noise reduction circuit performs NAND operation between the edge detection output and pulses obtained by making a second voltage comparator compare the sawtooth voltage with a predetermined reference voltage so that noise components having a polarity opposite to those pulses are reduced.

4. A three-phase brushless motor drive circuit that switches its output voltages by producing drive signals displaced in phase relative to one another, comprising:

voltage comparators, provided one for each phase, for comparing output voltages appearing across coils of a three-phase motor individually with a voltage at a terminal common to three phases;

a reference clock generating circuit for generating a reference clock based on voltages outputted from the voltage comparators, said reference clock being displaced in phase by 60° relative to switching timing of the output voltages and having one third of a period of the output voltages;

a detecting circuit for detecting edges of the reference clock;

a noise reduction circuit for reducing noise components that are generated by noises included in the output voltages when the reference clock is subjected to edge detection;

an RS flip-flop for forming a pulse-train signal by using as a set signal an edge detection output obtained through the noise reduction circuit;

a circuit for controlling charging and discharging of one capacitor in synchronism with the pulse-train signal;

a first voltage comparator for performing voltage comparison between a sawtooth voltage appearing across the capacitor and a first reference voltage to reset the RS flip-flop in accordance with a result of the voltage comparison;

means for forming three-phase drive signals in synchronism with the pulse-train signal outputted from the RS flip-flop;

a second voltage comparator for comparing the sawtooth voltage with a second reference voltage; and means for feeding pulses outputted from the second voltage comparator to the noise reduction circuit to achieve noise reduction.

5. A three-phase brushless motor drive circuit as claimed in claim 4, wherein the noise reduction circuit reduces noises present during periods of the pulses fed from the second voltage comparator.

* * * * *